United States Patent [19]
Hastings

[11] 3,737,635
[45] June 5, 1973

[54] CONSTANT LINE OF POSITION NAVIGATION SYSTEM

[75] Inventor: Charles E. Hastings, Newport News, Va.

[73] Assignee: Teledyne, Inc., Los Angeles, Calif.

[22] Filed: Oct. 12, 1971

[21] Appl. No.: 188,196

[52] U.S. Cl........235/150.26, 114/144 R, 235/150.2, 318/588
[51] Int. Cl..............................G06g 7/66, G05d 1/00
[58] Field of Search.......................235/150.2, 150.26, 235/150.27, 150.272, 150.22; 340/30; 343/113 R, 114, 107–110; 318/585, 586, 588; 114/144 R; 35/10.2; 33/324, 326, 356

[56] References Cited

UNITED STATES PATENTS

| | | | |
|---|---|---|---|
| 3,517,285 | 6/1970 | Kundler | 318/588 |
| 3,596,163 | 7/1971 | Barrett | 114/144 R X |
| 3,660,743 | 5/1972 | Kundler et al. | 318/588 |
| 3,670,227 | 6/1972 | Kundler et al. | 318/588 X |
| 3,603,775 | 9/1971 | Galloway et al. | 235/150.26 |
| 3,604,907 | 9/1971 | Wesner | 235/150.2 |
| 3,656,043 | 4/1972 | Kawada et al. | 235/105.2 X |
| 3,665,281 | 5/1972 | Hirokawa | 318/588 |

*Primary Examiner*—Malcolm A. Morrison
*Assistant Examiner*—Jerry Smith
*Attorney*—Ronald W. Reagin, Ralph M. Braunstein

[57] ABSTRACT

A constant line of position navigation system is disclosed in which an error signal is generated whenever a vessel carrying the system deviates from a predetermined line of position. This error signal is used to deflect the needle of the compass on the vessel to indicate to a helmsman or the autopilot that a correction in the heading of the vessel must be made to bring the vessel back onto the predetermined course.

11 Claims, 3 Drawing Figures

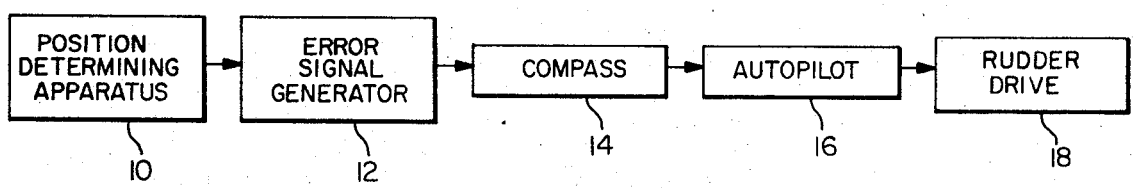
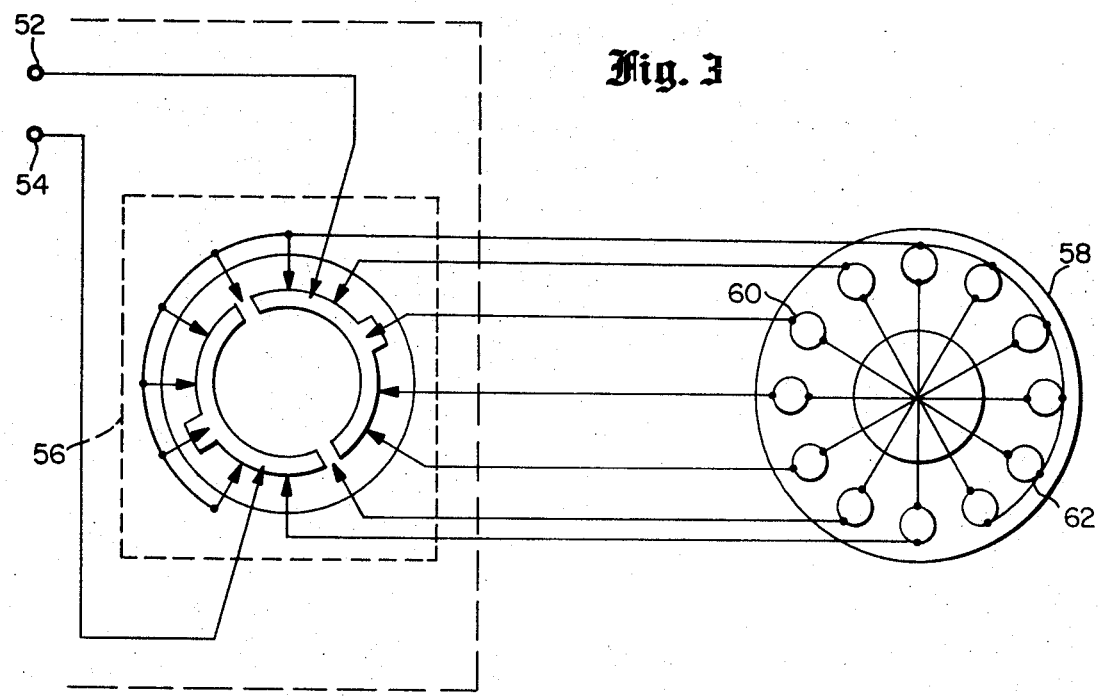
CHARLES E. HASTINGS
INVENTOR

CONSTANT LINE OF POSITION NAVIGATION SYSTEM

The present invention relates to navigation systems, and more partiularly to a simple and inexpensive apparatus for use on vessels which have line of position navigation systems to enable the vessel to be steered along a desired line of position, whether such steering is effected manually or automatically.

Line of position navigation systems, such as hyperbolic isophase line of position systems, are commonly used on ships and vessels as part of the navigation equipment of the vessel. Such systems have been highly developed in recent years, and they have gained particularly widespread acceptance in applications where the vessel is out of sight of land and in applications which require extremely precise navigational information.

The output of a line of position navigation system is usually either a digital output indicating an arbitrary "lane" in which the vessel is positioned that instant, or a saw-tooth like graph on a moving strip chart, again indicating the instantaneous position of the vessel in an arbitrary lane. In either event, the output is not meaningful in itself. Instead, a helmsman or navigator must refer to a previously prepared chart of the area in order to determine the line of position along which the vessel is located at that instant.

Because the output information of the system does not have absolute meaning, such as does a compass heading or the like, a relatively untrained helmsman sometimes has difficulty relating the line of position information to the physical surrounding of the vessel and the proper heading of the vessel. If such a helmsman were attempting to follow a line of position without the aid of a compass or with a conventional compass not employing the present invention described below, and the vessel were subjected to cross-winds or currents which would cause a change in the vessel's heading which would not immediately be reflected in the systems output indication, the helmsman would very likely cause the vessel to follow a fishtailing line of position. Because of this experienced difficulty, many users of such navigation systems employ other auxiliary aids in steering, such as steering the vessel with relation to the waves or steering the vessel with relation to visual objects on the horizon, and then correcting the heading of the vessel based on the line of position reading. This is obviously not a satisfactory solution to the problem, and such users are anxious to have an improved system in which it would be easier to follow a predetermined line of position.

Of course, the problem is not a severe one if a computer is on board the vessel and can be used to solve the problem. However, such computers are expensive and frequently unavailable for use in following a desired line of position. Accordingly, there is a need for such a system which is simpler and considerably less expensive than using a computer to solve the problem.

It is accordingly an object of the present invention to provide an improved navigation system for vessels which are using a line of position navigation system.

It is another object of the present invention to provide an improved line of position navigation system in which the helmsman can easily follow a predetermined line of position.

It is yet another object of the present invention to provide an improved line of position navigation system in which a predetermined line of position can easily be followed which is simple and inexpensive and does not require a computer or the like.

Many vessels which employ line of position navigation systems also have a conventional autopilot which is responsive to the heading of the vessel as indicated by the vessel's compass and which controls the rudder of the vessel to maintain the vessel on a predetermined compass heading. Such systems are, of course, well known to those skilled in the art and most commercial and military vessels, as well as many pleasure vessels, are already equipped with this type of apparatus. Of course, it is well known that such autopilots only maintain the ship on a constant compass heading, and are completely subject to the whims of cross-winds and cross-currents which might deflect the vessel further and further off of a desired course even though the vessel is continuously maintained at a constant compass heading.

It is yet another object of the present invention to provide an improved line of position navigation system which employs a conventional autopilot to maintain the vessel on a predetermined line of position.

Briefly stated, and in accordance with the presently preferred embodiment of the invention, a vessel navigation system is provided which includes positioning determining apparatus for indicating the line of position along which the vessel lies and a compass for indicating the heading of the vessel at a particular instant. Error signal generating means are provided which are responsive to the position determining apparatus for generating an output signal whenever the vessel deviates from a predetermined line of position. Deflection means are provided on the compass to deflect the needle of the compass to have a "false" indication other than the true heading of the vessel. The output signal from the error signal generating means is connected to the deflection means on the compass, whereby the compass has such a "false" indication whenever the vessel deviates from the predetermined line of position. A helmsman may then visually observe the compass and make the necessary correction on the heading of the vessel to bring the vessel back onto the desired line of position, or an autopilot may be employed to bring the vessel back to the desired line of position. Neither the helmsman nor the autopilot need concern itself with whether the change in the compass indication was caused by a change in the heading of the vessel or by a lateral deflection of the vessel off course. In either event, the helmsman or the autopilot makes the necessary correction to bring the vessel back onto the desired course.

For a complete understanding of the invention, and an appreciation of its other objects and advantages, please refer to the following detailed description of the attached drawings, in which:

FIG. 1 is a block diagram of a vessel navigation system employing the present invention;

FIG. 3 is a schematic representation of a second embodiment of the compass deflecting means of FIGS. 1 and 2.

Figure 2:
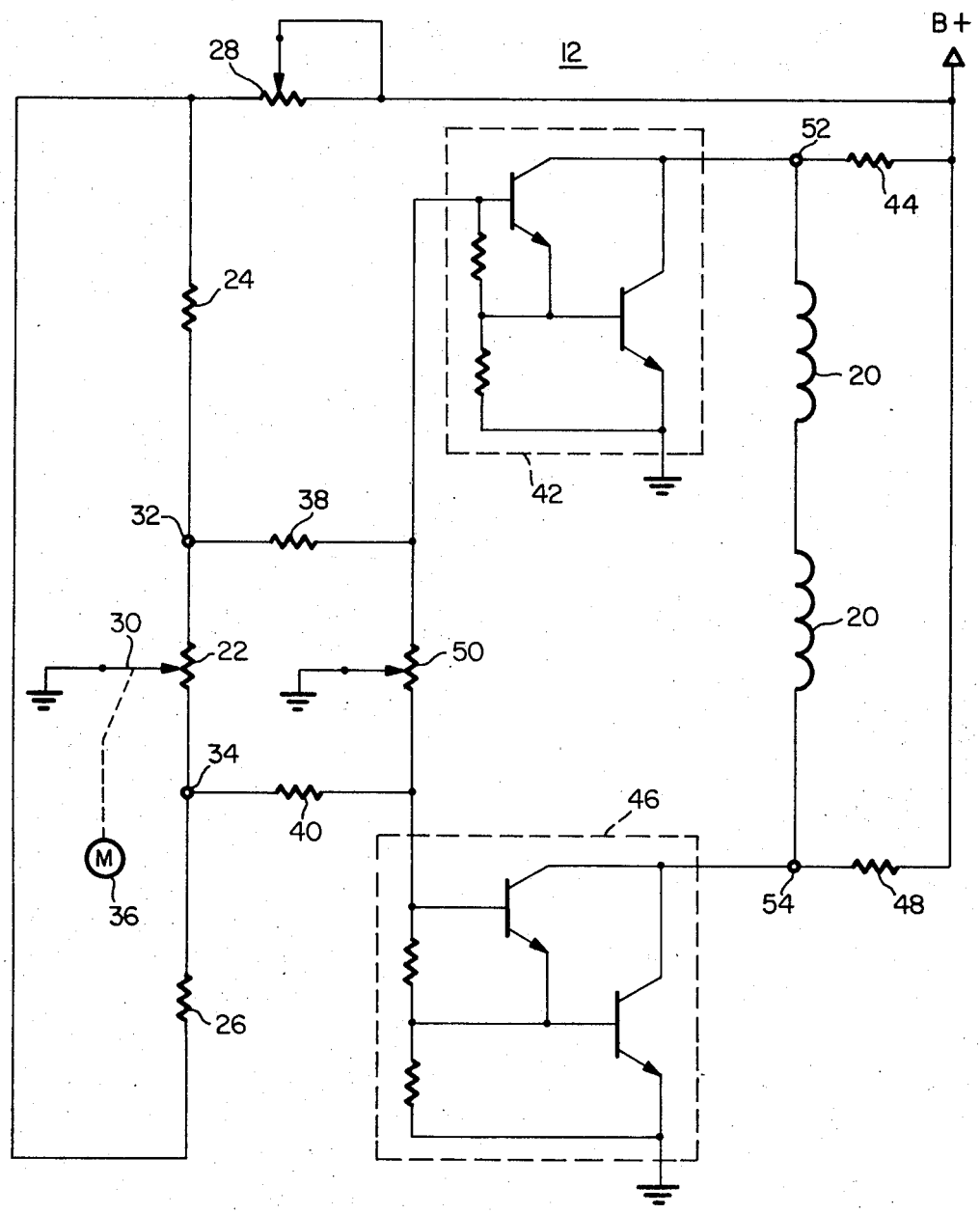
FIG. 2 is a schematic representation of the error signal generating means and compass deflection means of the system of FIG. 1.

FIG. 1 shows a block diagram of a navigation system incorporating the present invention. As shown therein, the system includes a positioning determining apparatus 10 for determining a line of position along which the vessel lies at a given instant. Preferably, apparatus 10 is a hyperbolic isophase line of position navigation system such as is disclosed in co-pending application Ser. No. 96,767, filed Dec. 10, 1970 by Charles E. Hastings and William A. Rounion and assigned to the assignee of the present application.

Position determining apparatus 10 controls an error signal generator 12, which generates an output signal whenever the position of the vessel deviates from the predetermined line of position as indicated by apparatus 10. Error signal generator 12 generates an output signal whose sense or polarity is a function of the direction of deviation of vessel 10 from the predetermined line of position and whose magnitude is a function of the amount of deviation from the desired line of position. Details of a suitable such error signal generator and its manner of control by positioned determining apparatus 10 are shown and described in FIG. 2 below.

The navigation system of the present invention also includes a compass 14, which may be any desired form of compass. In the preferred embodiment, compass 14 is a magnetic compass since as is described below, this type of compass readily lends itself to deflection by the output signal of error signal generator 12, but alternatively it could be a gyrocompass. Compass 14 is provided with means for deflecting the needle of the compass to cause the compass to have a "false" indication other than the true heading of the vessel. In the preferred embodiment, in which compass 14 is a magnetic compass, this deflecting means is a magnetic coil attached to the compass which is energized by the output signal of error signal generator 12. When the deflection coil is so energized, a magnetic field is created to deflect the needle of the compass and cause the compass to have a "false" indication. The sense of the energization of the magnetic coil is chosen so that the needle of the compass 14 is deflected in the appropriate direction to cause a helmsman or an autopilot to change the heading of the vessel to bring it back along the desired line of position whenever position determining apparatus 10 indicates that the vessel has departed from the desired line of position.

For example, suppose that the vessel carrying the present navigation system is headed in a true northerly direction, or at a compass heading of zero degrees. Now, suppose that a westerly current or wind causes the vessel to drift in a easterly direction, or to starboard, even though the heading of the vessel remains at zero degrees. Error signal generator 12 now provides an output signal to the deflection coil on compass 14 of such polarity or sense to generate a deviation magnetic field which causes the needle of compass 14 to deflect in a counterclockwise direction, or to a direction west of north. The magnitude of the output signal of error signal generator 12, and thus the magnitude of the counterclockwise deflection of the needle of compass 14 is a function of how far off of the line of position the vessel has deviated. Now a helmsman or the autopilot, seeing the "false" indication on the compass, knows that the vessel is deviating off of the desired line of position and turns the rudder to bring the heading of the vessel to a bearing west of north. As the vessel proceeds at this new heading this brings the vessel back into the proper desired line of position. This causes the magnitude of the output signal from error signal generator to gradually decrease, thereby causing the amount of counterclockwise deflection of the needle of the compass to gradually decrease, and the helmsman or autopilot gradually turns the heading of the vessel back to starboard as the vessel nears the desired line of position. When the desired line of position is reached, the helmsman or the autopilot has now brought the vessel back to a true northerly, or zero degree heading and the vessel proceeds along the desired line of position.

It is noted that the procedure just described is exactly the same as would have happened if the heading of the vessel had for some reason changed from true north to a direction east of north, such as would have happened if for some reason the vessel had turned to starboard. The helmsman or the autopilot need not know if the navigational error which the system is correcting was caused by an actual change in the heading of the vessel or a true lateral shift in the position of the vessel while maintaining a constant heading. In either case the helmsman or the autopilot makes the necessary corrections to bring the vessel back to the proper line of position.

Continuing now the description of FIG. 1, in the preferred embodiment of the invention an autopilot is used although, as was just described, the system is equally applicable when the vessel is being steered by a helmsman. Autopilot 16 is controlled by compass 14 in the conventional manner well known to those skilled in the art. Autopilot 16 in turn controls rudder drive 18 which controls the turning movement of the vessel. As was just described above, whenever the indication of the compass changes, either from a change in the heading of the vessel or because of an output signal from error signal generator 12, autopilot 16 under the control of compass 14 makes the necessary adjustment in rudder drive 18 to bring the vessel back to the desired heading on the desired line of position.

FIG. 2 shows a schematic representation of a suitable error signal generator 12 which may be used with the navigation system of FIG. 1 and also illustrates the manner in which it is controlled by the position determining apparatus 10 and the manner in which its output signal is applied to a pair of deflection coils 20 to generate a "deviation field" to deflect the needle of compass 14 (not shown in FIG. 2).

The error signal is initially developed in a resistance bridge network formed from the two halves of potentiometer 22 and the resistances 24 and 26. As is shown in FIG. 2, the common terminal of resistances 24 and 26 is connected through a variable resistor 28 to a suitable voltage source and the slide contact 30 of potentiometer 22 is connected to ground or another suitable point of reference potential. Thus, a resistance bridge network is formed which has as its output terminals the end terminals of potentiometer 22, or output terminals 32 and 34.

A stepping motor 36 is provided which drives the slide contact 30 of potentiometer 22. Stepping motor 36 is controlled by the position determining apparatus 10 of FIG. 1 (not shown in this Figure). Thus, under the control of stepping motor 36, slide contact 30 of potentiometer 22 is moved in a direction and an amount which is a function, respectively, of the sense and the magnitude of the amount of deviation of the vessel from the desired line of position. Accordingly, a potential appears between terminals 32 and 34 whose polarity is a function of the sense of any deviation of the vessel from the desired line of position and whose magnitude is a function of the amount of deviation of the vessel from the desired line of position.

The terminals 32 and 34 are connected through resistances 38 and 40, respectively, to a second bridge circuit. The second bridge circuit includes a first leg having an amplifier 42 and its load resistance 44 therein. The second leg of the bridge network is the amplifier 46 and its load resistance 48. The amplifiers 42 and 46 may be conventional Darlington amplifiers, as shown. The second bridge circuit is completed by the potentiometer 50, connected as shown to enable the second bridge circuit to be precisely balanced to provide no output signal when the vessel is on the desired line of position.

The output terminals 52 and 54 of error signal generator 12 are the output terminals of the second bridge network, with output terminal 52 being at the junction of amplifier 42 and its load resistance 44 as shown and output terminal 54 being at the junction of amplifier 46 and its load resistance 48 as shown. As is shown, the pair of deflection coils 20 are connected between the output terminals 52 and 54 of error signal generator 12.

Those skilled in the art will readily appreciate the operation of error signal generator 12. When position determining apparatus 10 indicates that the vessel has deviated from a desired line of position, stepping motor 36 is driven to unbalance the first bridge circuit. At this time, a signal exists between terminals 32 and 34 whose sense and magnitude indicates the sense and magnitude, respectively, of the deviation of the vessel from the desired line of position. This in turn unbalances the second bridge circuit and provides an energization of deflection coils 20 of a similar sense and magnitude. When this occurs, as was described in connection with FIG. 1 above, the helmsman or automatic pilot brings the vessel back onto the desired line of position.

FIG. 3 shows a schematic representation of a second arrangement of magnetic deflection coils which may conveniently be used with the present invention. If only a single pair of deflection coils, such as deflection coils 20 of FIG. 2, are used with the system of the present invention, optimum operating results require that the deflection coils be rotated around the outside of compass 14 to be generally aligned with the direction of the desired line of position which the vessel is to travel. FIG. 3 shows an arrangement of deflection coils which eliminates the necessity for rotating the coils into alignment with the direction of travel. As is shown therein, the output terminals 52 and 54 of error signal generator 12 are connected to the input terminals of a 12-position rotary switch 56. The seven output leads from rotary switch 56 are connected to a 12-coil deflection ring 58 in the manner shown in FIG. 3. As is shown therein, opposing pairs of the deflection coils in deflection ring 58 are connected in series with each other and to a respective position on rotary switch 56. For example, the deflection coils 60 and 62 are connected to the switch as shown so that when the switch is in the angular position shown in FIG. 3, these deflection coils are connected to the output terminals 52 and 54.

In the arrangement shown in FIG. 3, it is no longer necessary to rotate the deflection ring to provide optimum operating results from the system. Instead, rotary switch 56 is positioned to connect the terminals 52 and 54 to the opposed pair of coils which is most nearly aligned with the direction of travel of the vessel. For example, if a 12-coil deflection ring such as is shown is used, the angle between adjacent opposed pairs is only 30°, and the nearest pair of coils to a desired line of travel must be not more than 15° offset from this desired line of travel. This is easily close enough to provide optimum operating results from the system.

While the invention is thus disclosed and several embodiments described in detail, it is not intended that the invention be limited to these shown embodiments. Instead, many modifications will occur to those skilled in the art which lie within the spirit and scope of the invention. Accordingly, it is intended that the invention be limited in scope only by the appended claims.

What is claimed is:

1. In a vessel navigation system which includes position determining apparatus for indicating a line of position along which the vessel lies and a compass for indicating the heading of the vessel, the improvement comprising:
   error signal generating means responsive to said position determining apparatus for generating an output signal whenever said vessel deviates from a predetermined line of position;
   deflection means for causing said compass to have a "false" indication other than the true heading of said vessel; and
   means for connecting an output signal from said error signal generating means to said deflection means, whereby said compass has a "false" indication whenever said vessel deviates from said predetermined line of position.

2. The invention of claim 1 in which said error signal generating means comprises means for generating an output signal whose sense is a function of the sense of the deviation of said vessel from said predetermined line of position and whose magnitude is a function of the magnitude of the deviation of said vessel from said predetermined line of position, whereby the "false" indication of said compass has a sense and magnitude which is a function of the sense and magnitude, respectively, of the deviation of said vessel from said predetermined line of position.

3. The invention of claim 2 in which said compass is a magnetic compass and said deflection means comprises magnetic coil means positioned adjacent to said compass for generating a deviation field in response to the output signal of said error signal generating means.

4. The invention of claim 3 in which said error signal generating means comprises a bridge circuit having a first and second leg each including a series connection of an amplifier and a load resistor, and having an output terminal between said amplifier and said load resistor, control means responsive to said position determining apparatus for controlling the conductivity of said amplifiers as a function of the sense and magnitude of the deviation of said vessel from said predetermined line of position, and in which said magnetic coil means is connected between said output terminals.

5. The invention of claim 4 in which said control means comprises a potentiometer having a slide contact, a stepping motor driven by said position determining apparatus, and means connecting said motor to said slide contact.

6. The invention of claim 5 in which said magnetic coil means comprises a plurality of pairs of magnetic coils positioned around said compass and which further comprises a rotary switch for connecting one of said pairs of magnetic coils between said output terminals of said error signal generating means.

7. The invention of claim 2 which further comprises an autopilot for maintaining said vessel at a constant heading as indicated by said compass.

8. The invention of claim 7 in which said compass is a magnetic compass and said deflection means comprises magnetic coil means positioned adjacent to said compass for generating a deviation field in response to the output signal of said error signal generating means.

9. The invention of claim 8 in which said error signal generating means comprises a bridge circuit having a first and second leg each including a series connection of an amplifier and a load resistor, and having an output terminal between said amplifier and said load resistor, control means responsive to said position determining apparatus for controlling the conductivity of said amplifiers as a function of the sense and magnitude of the deviation of said vessel from said predetermined line of position, and in which said magnetic coil means is connected between said output terminals.

10. The invention of claim 9 in which said control means comprises a potentiometer having a slide contact, a stepping motor driven by said position determining apparatus, and means connecting said motor to said slide contact.

11. The invention of claim 10 in which said magnetic coil means comprises a plurality of pairs of magnetic coils positioned around said compass and which further comprises a rotary switch for connecting one of said pairs of magnetic coils between said output terminals of said error signal generating means.

* * * * *